Jan. 23, 1951 A. BAIDEME ET AL 2,539,174
HYDRAULICALLY CONTROLLED TRACTOR MOUNTED HOE
Filed Feb. 4, 1947 6 Sheets-Sheet 1

Inventors,
Anthony Baideme,
and Edgar M. Cowan,
By Ferrill S. Appleman,
Attorney.

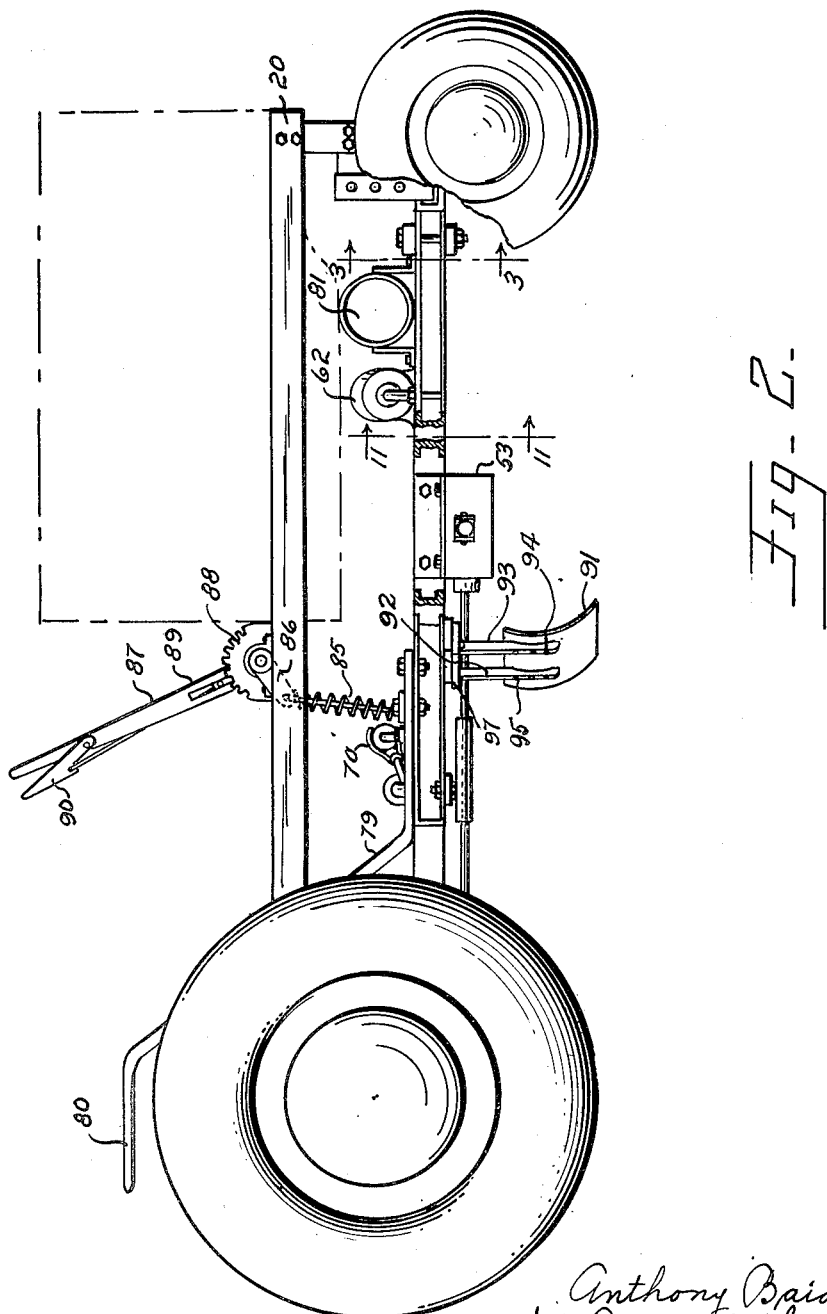

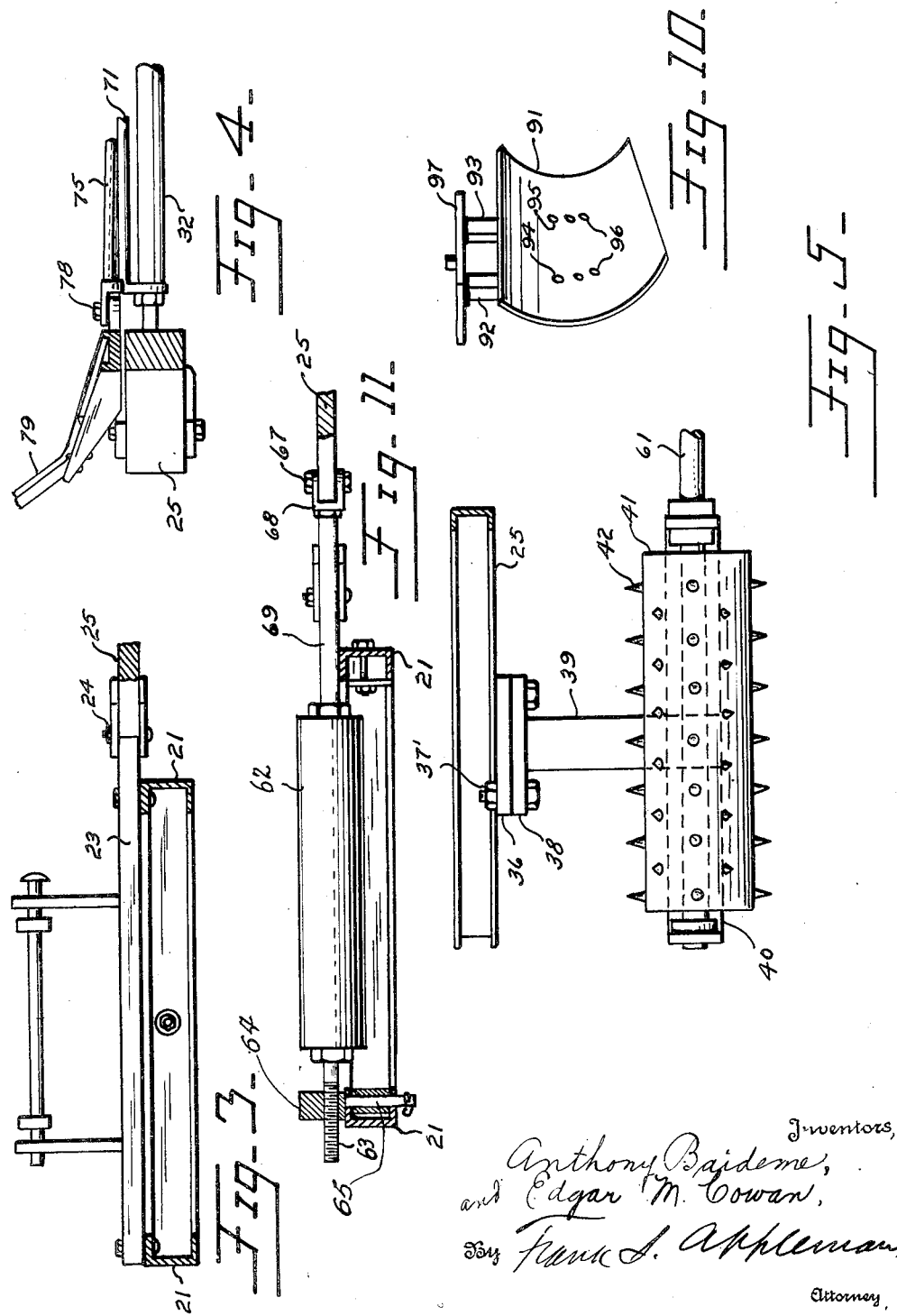

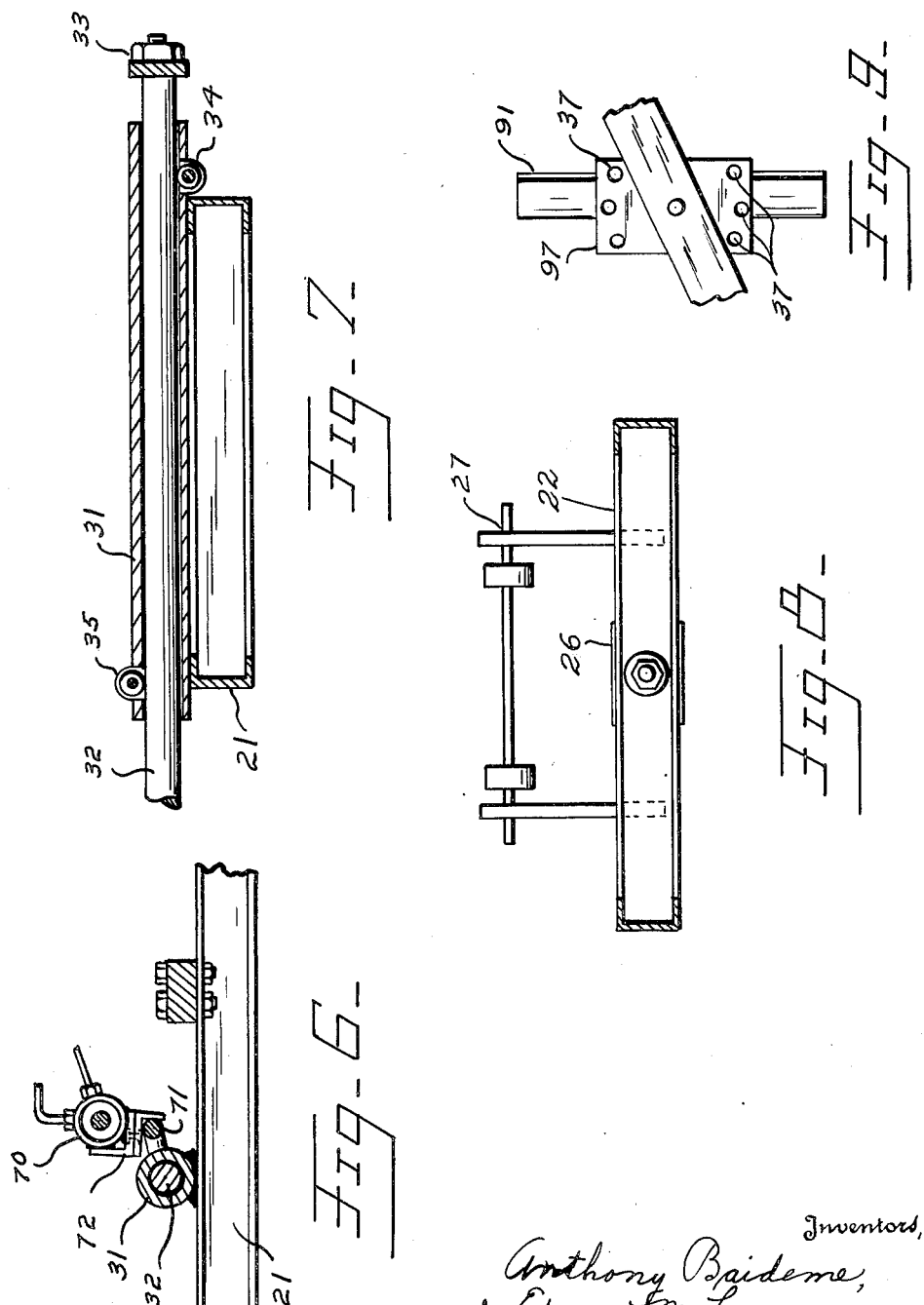

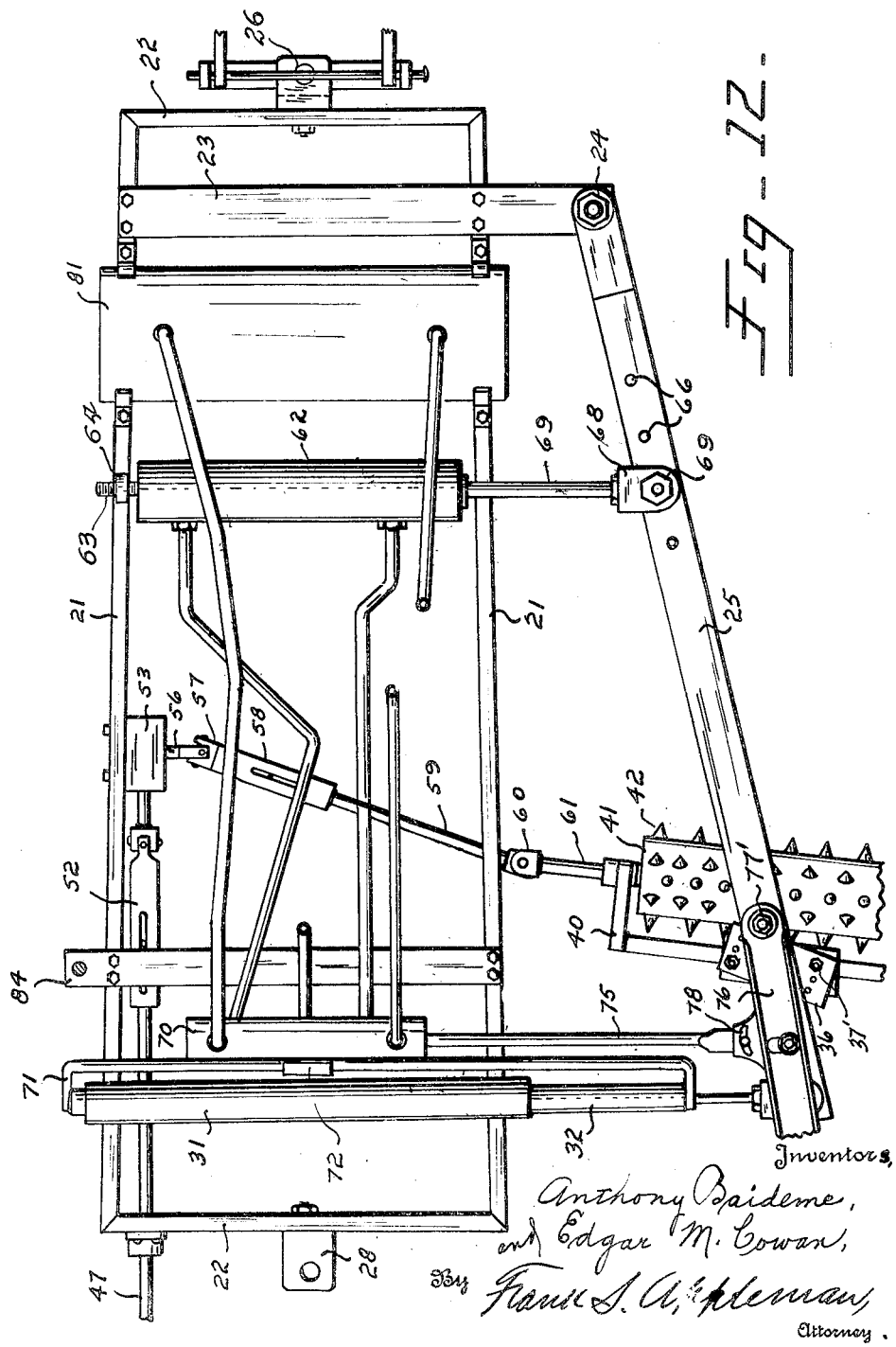

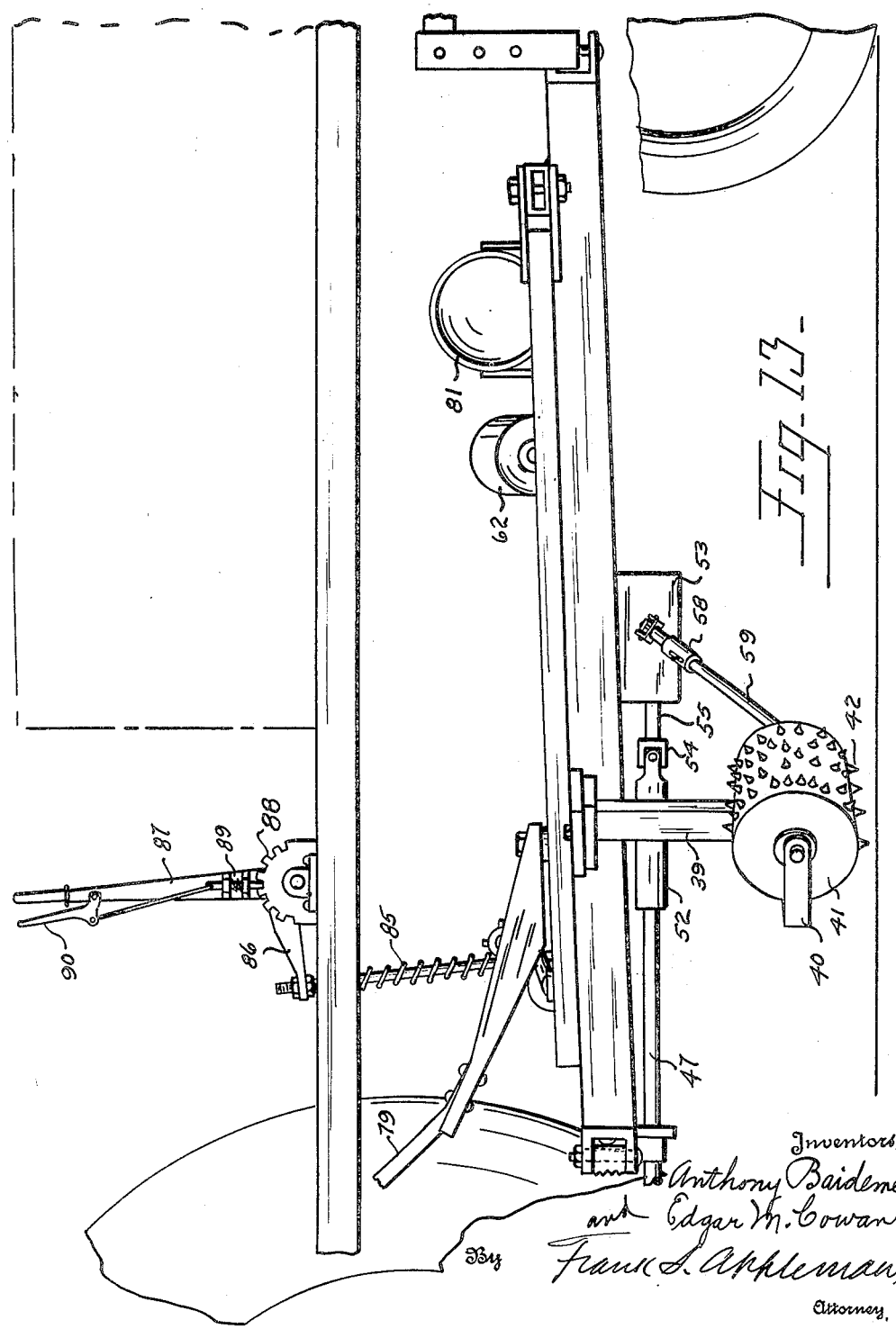

Patented Jan. 23, 1951

2,539,174

UNITED STATES PATENT OFFICE 2,539,174

HYDRAULICALLY CONTROLLED TRACTOR MOUNTED HOE

Anthony Baideme and Edgar M. Cowan, Westfield, N. Y.; said Baideme assignor to said Cowan Application February 4, 1947, Serial No. 726,300

6 Claims. (Cl. 97—47)

This invention relates to agricultural implements, and more particularly to attachments for farm tractors.

It is an object of our invention to provide a hoeing attachment for farm tractors that may be easily attached or removed from a tractor.

It is another object of our invention to provide a tool attachment for tractors in which the pressure of the tool upon the ground may be easily adjusted.

Another object of this invention is to provide a hoeing attachment for tractors that may be easily adjusted as to angle of approach.

Still another object of this invention is to provide a tractor tool attachment that is adjusted by hydraulic means.

Yet another object of our invention is to provide a tractor hoe attachment that may be easily changed from a rotary type peg hoe to a blade hoe.

A further object of our invention is to provide a tractor attachment which is in the form of a complete unit mounted upon a frame structure adapted to fit existing tractors with little or no change to the tractor.

Another object of our invention is to provide a hydraulically actuated hoeing attachment that may be controlled from the driver's position of the tractor.

Still another object of our invention is to provide a tractor hoe attachment in which the same degree of support and stability is attained regardless of the angle and speed of the hoe.

A further object of our invention is to provide a tractor attachment in which one agricultural tool may be quickly and simply changed for any other desired type of tool.

The above and other objects and advantages of our invention will be readily ascertained when the following specification is read in conjunction with the accompanying drawings in which Figure 1 is a plan view of the hoeing attachment in operative position when mounted upon a tractor.

Figure 2 is a side elevation of the attachment showing the relative location of the unit on a tractor, in which the scraping blade is installed.

Figure 3 is a cross sectional view of the device taken along the plane 3—3 in Figure 2.

Figure 4 is a cross sectional view taken along the plane 4—4 of Figure 1.

Figure 5 is a view of the rotary peg hoe assembly taken along the plane 5—5 of Figure 1.

Figure 6 is a cross sectional view of the hydraulic control cylinder and assembly taken along the plane 6—6 of Figure 1.

Figure 7 is a cross sectional view of the extensible rail support taken along the plane 7—7 of Figure 1.

Figure 8 is a cross sectional view of the frame and front hanger taken along the plane 8—8 of Figure 1.

Figure 9 is a top view of the blade type of hoe which may be used in place of the rotary peg hoe.

Figure 10 is a perspective view of the blade hoe which may be substituted for the rotary peg type hoe.

Figure 11 is a cross sectional view taken along the plane 11—11 of Figure 2 showing the hydraulic power cylinder.

Figure 12 is a plan view of the entire attachment shown in larger scale than Figure 1.

Figure 13 is a side elevation of the attachment shown in larger scale than Figure 2.

Figure 1:
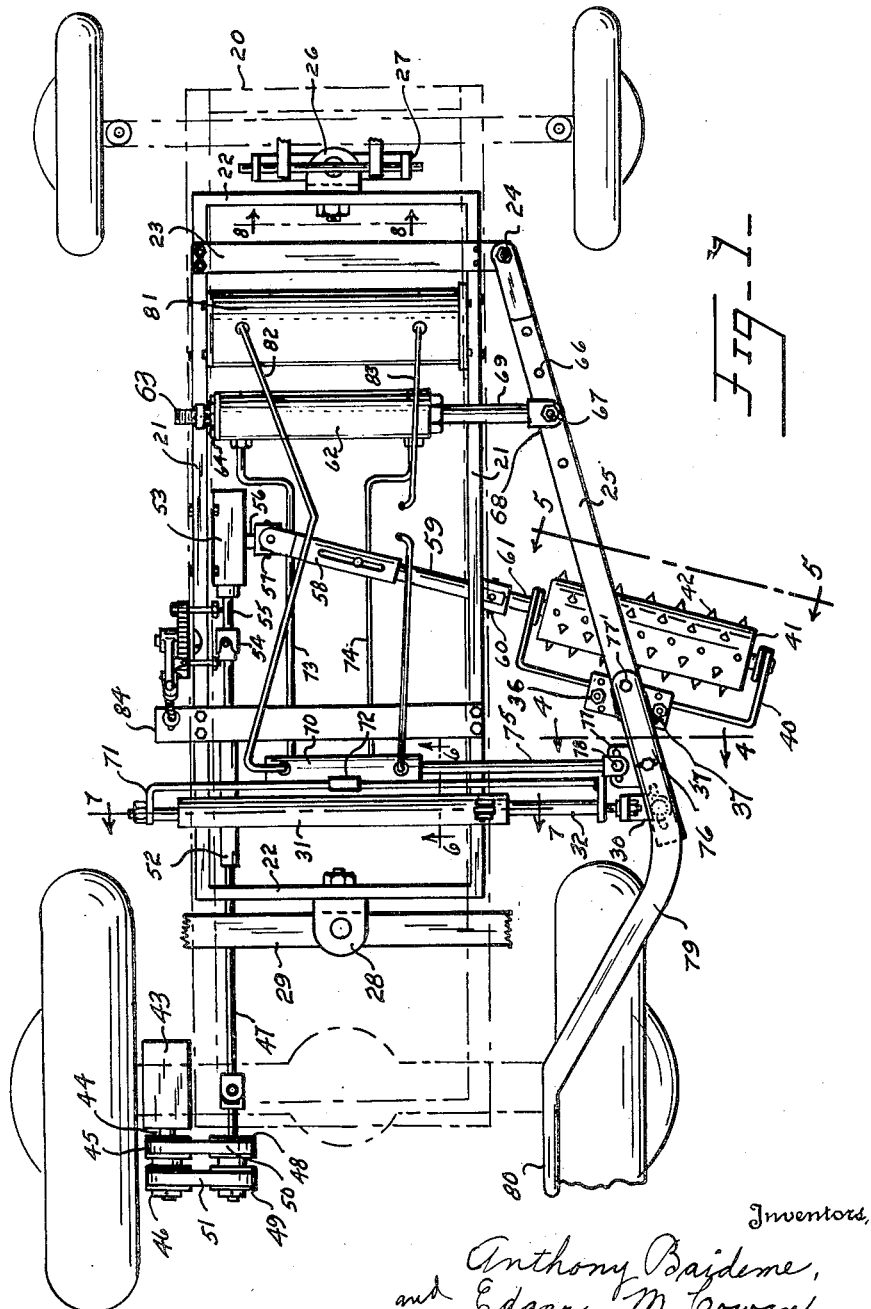

Although our useful attachment is illustrated and described as being a hoe and utilized with a particular type of farm tractor it is obvious that our attachment may be utilized with many other types of tractors and may utilize other types of agricultural tools than a hoe.

Referring to Figure 1 it is seen that the reference numeral 20 refers to the frame of a tractor to which the attachment is to be mounted. The hoeing attachment is mounted upon a rectangular frame having side members 21, 21 and end members 22, 22. Mounted crosswise on the front of the rectangular frame is a cross bar 23 to which is pivotally mounted at 24 a draw or pull bar 25. It is the draw or pull bar 25 that carries the hoe or other tool in all the desired positions and degrees of pressure on the earth. The rectangular frame and the draw bar may be formed of metal or any other structural material so as to give the desired strength and yet not add too much weight to the tractor. The entire attachment is supported from the tractor frame at two points, one support being by means of a clevis 26 mounted at the center of the front frame member 22. The front clevis 26 is pivotally connected to a hanger 27 which is mounted on the tractor frame. In a similar manner a rear clevis 28 forms the second support and is mounted upon the center of the rear frame member 22. The rear clevis 28 is pivotally connected to a push bar 29 of the tractor.

The draw bar 25 is pivotally supported at its other end by an extensible track or support which terminates in a pivot connection to a clevis 30 mounted on the rear of the draw bar 25. The extensible track or support which is shown in detail in Figures 1 and 7 will now be described. The extensible support comprises a hollow cylindrical member 31 which is securely fastened by welding or other suitable means in a crosswise fashion upon the longitudinal frame members 21, 21. Positioned within the cylindrical member 31 and adapted for reciprocating movement therein is a rod 32 having a nut 33 threaded upon one end thereof for connection with the clevis 30. To reduce friction when the rod 32 moves in and out of the shell 31 there are provided two rollers 34 and 35 mounted in the shell 31. The roller 34 is mounted in a slot formed in the under side of the shell 31, while the roller 35 is mounted in a slot formed in the upper portion of the shell. The structure just described provides an extensible support for the back end of the draw bar 25 giving the requisite support for all angular positions of the draw bar.

For the support of the hoe itself, a plate 36 is securely mounted on the underside of the draw bar 25. A series of holes 37 are made in the plate 36 for the passage therethrough of bolts 37' to tightly hold a second plate 38 having a vertical depending member 39 thereon. At the lower end of the depending member 39 is fastened a yoke 40 into which is rotatably mounted a hoe cylinder 41 having pegs 42 perpendicularly mounted thereon. The cylinder 41 is the rotary peg hoe and may be adjusted as to angular position by shifting the plate 38 relative to the plate 36 and placing the bolts 37' through a different set of holes 37 in plate 36 and plate 38.

The rotary peg hoe 41 is power driven from the tractor power take-off in a manner now to be described. The tractor power take-off is represented by the reference numeral 43 from which extends a shaft 44 on which is mounted two pulleys 45 and 46. A longitudinal shaft 47 having two pulleys 48, 49 is connected to the power take-off 43 by means of the belts 50 and 51. The pulleys 45, 46, 48 and 49 are of the V-type, or, if desired the flat type of pulleys and belt may be utilized.

In order to take care of changes in shifting positions of the entire frame, the longitudinal power shaft 47 is made to telescope into an outer shell portion 52 and is keyed thereto to permit the shaft 47 to move into and out of the shell 52. The front end of the cylindrical shell 52 is connected to a gear box 53 through a universal joint 54 and connecting shaft 55. Extending from the gear box 53 at right angles to the stub shaft 55 is another stub shaft 56 having a universal joint 57 on the outer end thereof which is connected to a hollow cylindrical shell 58. In sliding relation to the interior of the shell 58 is keyed a shaft 59 having a universal joint 60 on the outer end thereof. The peg hoe 41 is provided with a shaft 61 fitted into the yoke 40. One end of the hoe shaft or axle 61 is connected to the universal joint 60 and thereby receives power to rotate the hoe 41 from the tractor power take-off 43.

The means by which the position of the rotary peg hoe 41 relative to the frame may be adjusted will now be described. In order that this adjustment be carried out from the driver's seat quickly and with little exertion a hydraulic actuating means has been utilized although it is understood that equivalents such as electric power may also be used. A double acting hydraulic cylinder 62 is horizontally positioned across the frame members 21, 21 with a threaded end 63 of the cylinder 62 being mounted upon a bracket 64 pivotally positioned by a pin 65 on the member 21 (Figure 11). The other end of the cylinder 62 is permitted to float freely. The draw bar 25 is provided with a series of holes 66 into one of which is fitted a clevis bolt 67 to pivotally mount a clevis 68 positioned on hydraulic piston rod 69. A plurality of holes 66 is provided through the draw bar 25 in order that a wide range of adjustments may be made in the lateral movement of the rotary hoe by means of the hydraulic piston actuating rod 69.

The hydraulic piston 69 is controlled from the driver's seat of the tractor by an easily adjusted control device now to be described. A hydraulic control cylinder 70 is mounted on a telescoping yoke 71 the ends of which are mounted on the extensible support. The control cylinder 70 is mounted upon the yoke 71 by means of a pivoted bracket 72 mounted upon the yoke 71. Within the control cylinder 70 are the usual valves to control the flow of fluid to either end of the actuating cylinder 62 through conduits 73 and 74. A valve rod 75 extends from the control cylinder 70 to a plate 76 having a slotted side member 77 to receive the end of the valve rod 75 having a bolt 78 thereon. One end of the plate 76 is pivotally mounted at 77' on the draw bar 25 and the other end of the plate rigidly supports an upwardly curving handle bar 79 having a handle portion 80 close to the driver's seat of the tractor. The control cylinder is so adjusted that only a small lateral movement of the handle 80 will actuate the control cylinder causing the hydraulic cylinder 62 to move the draw bar 25 to the desired position.

Fluid for the entire hydraulic system is held in a supply tank 81 which is mounted laterally on the main frame members 21, 21. Lines 82 and 83 carry the fluid from the main tank 81 to the control cylinder 70.

Our invention also includes means for adjusting the pressure of the hoe upon the earth and also for lifting the hoe completely out of contact with the earth. This means includes a lateral beam or member 84 securely fastened to the main longitudinal frame members 21, 21. A guide rod is operatively connected at one end to the beam 84 and at its opposite end to a lever 86 and a heavy spring 85 surrounds the guide rod. The lever 86 is secured to a handle 87 having a ratchet and pawl 88 and 89, respectively. The pawl 89 is released by a hand grip 90. By pulling the handle 87 in a downward direction the spring 85 is compressed applying pressure to the end of the lateral beam 84. Since the entire frame is pivoted at 26 and 28 the frame will rotate or pivot about a horizontal axis thus lifting the hoe completely away from the ground. By pulling the handle 87 in an upward or clockwise direction the spring 85 is placed under tension and the frame is biased to rotate in the opposite direction bringing the hoe into contact with the ground. Varying degrees of hoe pressure may be obtained by shifting the position of the handle 87.

Our invention, although primarily illustrated and described with the rotary type of hoe, may be easily adapted for use with the blade type of hoe. Figure 10 illustrates a blade type hoe which may be interchanged with the rotary peg hoe illustrated in Figure 1. The blade hoe comprises a curved blade 91 supported in a substantially vertical position by support members 92 and 93 by means of fasteners 94, 95 extending through openings 96. The plurality of openings 96 are provided to permit various mounting positions for the blade 91 on the mounts 92 and 93. A plate member 97 having a series of openings therein similar to those in the plate 38 carries the two support members 92 and 93. The blade hoe of Figure 10 may be substituted for the rotary peg hoe by merely disconnecting the power shaft 59 and universal joint 60 from the stub shaft 61, removing the bolts 37' from the plates 36, 38 and removing the rotary peg hoe 41 together with the support 39 and plate 38. The blade hoe is then attached by bolting plate 97 to the plate 38 utilizing the bolts 37'. The tractor is then ready to utilize the blade hoe which may be adjusted as to angle of approach and ground pressure in the same manner as may be done for the rotary peg hoe. It is obvious that no power is required from the power take-off 43 to operate the blade hoe since this type of hoe does not rotate.

Although our attachment has been described as using either a blade or rotary peg hoe it is obvious that other agricultural tools may be substituted and mounted upon the draw bar 25 in the same manner as the hoe.

While we have illustrated and described one embodiment of our invention it is obvious that many changes may be made by those skilled in the art without departing from the spirit of the invention.

Having thus described our invention in such terms that its construction and operation will be readily understood by those skilled in the art, what we claim as new and desire to secure by Letters Patent is:

1. A hoeing attachment for tractors comprising a substantially rectangular frame, a pivotal connection intermediate each end of the frame and the tractor whereby the frame may have pivotal movement about a horizontal longitudinal axis relative to the tractor, a draw bar pivotally mounted at one end thereof to said frame for movement about a vertical axis, power means supported by the frame and operatively connected to the draw bar for moving the draw bar about its pivot to the frame, an agricultural tool supported by and depending from the draw bar, and means cooperating with the frame to tilt the frame about its pivotal connections to the tractor whereby tilting movement in one direction will raise the agricultural tool while tilting movement in the opposite direction will lower the agricultural tool.

2. A hoeing attachment for tractors as claimed in claim 1 wherein an extensible support is carried by the frame adjacent the free end of the draw bar, and a connection between the extensible support and the draw bar.

3. A hoeing attachment for tractors as claimed in claim 1 where the power means for moving the draw bar includes a hydraulic power unit on the frame connected to the draw bar and a remote control device supported by the frame for acuating the hydraulic power unit.

4. A hoeing attachment for tractors comprising a substantially rectangular frame, a pivotal connection intermediate each end of the frame and the tractor whereby the frame may have pivotal movement about a horizontal longitudinal axis relative to the tractor, a cross bar supported by the frame adjacent the forward end of the frame, a draw bar pivotally mounted at one end to said cross bar for movement about a vertical axis, a hydraulic power unit supported by the frame rearwardly of the cross bar and operatively connected to the draw bar to move the draw bar about its pivot, an extensible support on the frame rearwardly of the hydraulic power unit, a connection between the extensible support and the free end of the draw bar, a yoke supported by and depending from the draw bar, a cylindrical hoe rotatably mounted in said yoke, power means to impart rotary movement to the hoe, a remote control device carried by said extensible support for actuating the hydraulic power unit, and means cooperating with said frame to tilt the frame about its pivotal connections to the tractor whereby tilting movement in one direction will raise the cylindrical hoe while tilting movement in the opposite direction will lower the cylindrical hoe.

5. A hoeing attachment for tractors as claimed in claim 4 wherein said cross bar, hydraulic power unit and extensible support are mounted on the frame in parallel relationship.

6. A hoeing attachment for tractors as claimed in claim 5 wherein the connection between the hydraulic power unit and the draw bar is adjacent to the pivot between the forward end of the draw bar and the cross bar.

ANTHONY BAIDEME.
EDGAR M. COWAN.

REFERENCES CITED

The following references are of record in the file of this patent:

UNITED STATES PATENTS

| Number | Name | Date |
|---|---|---|
| 959,390 | Rogge | May 24, 1910 |
| 987,855 | Burton | Mar. 28, 1911 |
| 1,620,085 | Driscoll | Mar. 8, 1927 |
| 1,729,073 | Johnston | Sept. 24, 1929 |
| 1,873,749 | Flanagan | Aug. 23, 1932 |
| 1,912,706 | Goodman | June 6, 1933 |
| 2,076,673 | Roper | Apr. 13, 1937 |
| 2,227,423 | Boyd | Jan. 7, 1941 |
| 2,250,073 | Weimer | July 22, 1941 |
| 2,253,130 | Lund | Aug. 19, 1941 |
| 2,319,255 | Norton | May 18, 1943 |
| 2,341,824 | Smith | Feb. 15, 1944 |
| 2,349,906 | Hyman | May 30, 1944 |
| 2,370,901 | Woodworth | Mar. 6, 1946 |

FOREIGN PATENTS

| Number | Country | Date |
|---|---|---|
| 79,908 | Switzerland | June 2, 1919 |